April 17, 1951     H. H. GORDON     2,549,450
INDICATING DEVICE FOR AUTOMOBILES

Filed Feb. 8, 1946     4 Sheets-Sheet 1

Inventor

HAYNER H. GORDON

By Ehun Stewart

Attorney

Inventor
HAYNER H. GORDON
By Elmer Stewart
Attorney

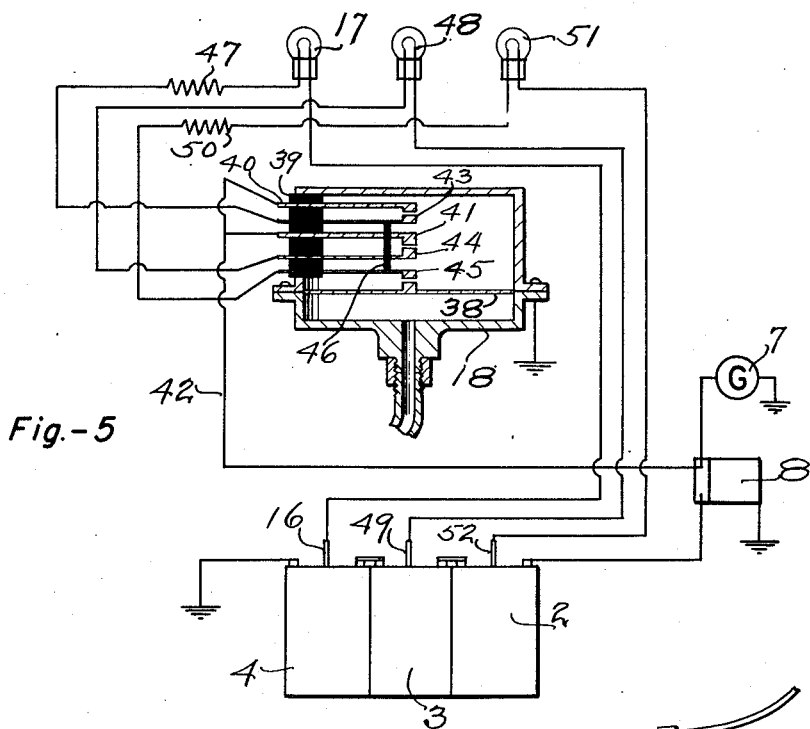
Fig.-5
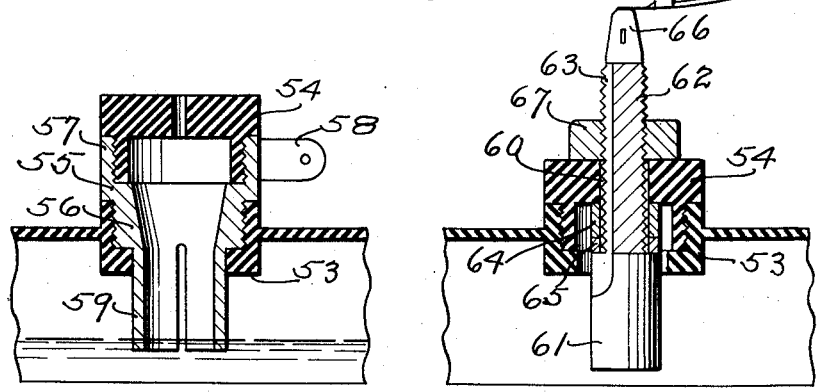
Fig.-6
Fig.-7
Inventor
HAYNER H. GORDON
By Elmer Stewart
Attorney April 17, 1951          H. H. GORDON          2,549,450
INDICATING DEVICE FOR AUTOMOBILES Filed Feb. 8, 1946          4 Sheets-Sheet 4

Inventor
HAYNER H. GORDON

By [signature]
Attorney

Patented Apr. 17, 1951

2,549,450

UNITED STATES PATENT OFFICE 2,549,450

INDICATING DEVICE FOR AUTOMOBILES

Hayner H. Gordon, Washington, D. C., assignor to The Hayner Corporation, New York, N. Y., a corporation of New York Application February 8, 1946, Serial No. 646,317

18 Claims. (Cl. 177—311)

The present invention relates to an indicating device for the operational characteristics of automotive vehicles.

The modern automotive vehicle, especially as characterized by the automobile, has become a complicated mechanism. Its power plant includes such correlated devices as an electrical generator, a storage battery, means for regulating the output of the generator irrespective of speed variation, an automatic electrical cutout between the generator and battery, and a means for supplying lubricating oil under pressure to the various components of the engine.

To indicate the proper functioning of these devices as well as other operational characteristics of the automobile, numerous indicating instruments are located on the dash or instrument panel usually in the form of dials with movable needles or hands. Although these instruments should be frequently observed, it is hazardous in either traffic or open road driving for the driver to do so and consequently the average driver ignores them.

It is one of the objects of the present invention to consolidate the indicators for the functions of two or more of these instruments in a single signal means either visual or audible in character and in a position to attract the attention of the driver.

It is a further object of the present invention to indicate by a suitable signal the normal functioning of certain portions of the automotive mechanism not heretofore brought to the attention of the driver.

Other objects such as the combining of these new indications with one or more of those indicated by the present instrument panel will be apparent from the following description of the preferred embodiment of my invention, as illustrated on the accompanying drawings, showing various modifications embodying the present invention, and in which Fig. 1 is a diagrammatic representation of a generator-battery circuit including my improved device for indicating the normal functioning of the generator and charging circuit and the level of the electrolyte in the battery;

Fig. 5 is a view of a circuit similar to Fig. 2 and having individual indicators for the several battery cells.

Fig. 6 is a vertical section of a suitable electrode using the conventional battery cap;

Fig. 7 is a vertical section of another form of electrode using a modified battery cap and adapted for universal application to various makes of batteries.

Figure 1:
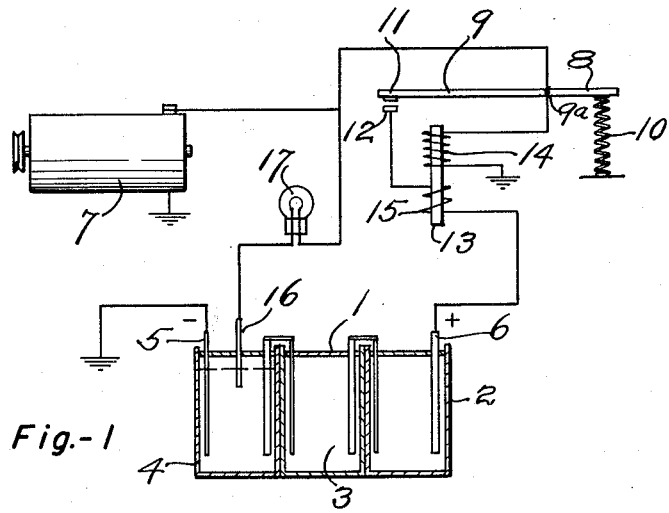

In the embodiment of the invention illustrated in Fig. 1 a storage battery 1 consisting of three individual cells 2, 3 and 4 has its negative terminal 5 grounded and its positive terminal 6 adapted for connection to a conventional variable speed generator 7 by means of an automatic cutout or relay 8. The latter, in its conventional form, comprises an armature 9 pivoted at 9a and normally held open by means of a spring 10. The armature carries a contact 11 which cooperates with a second contact 12 to complete the circuit between the generator and battery through the pivoted armature. The means for actuating the armature consists of a magnet core 13 with a shunt winding 14 connected across the generator terminals (through ground) and a series winding 15 in the circuit between the generator and battery.

It is well known that the relationship between the shunt winding and the armature spring is such that it will only actuate the armature when the voltage of the generator is higher than that of the battery. As the voltage of a fully charged battery is about 2.5 volts per cell, or for a three-cell battery 7.5 volts, the conventional cutout is designed to close the circuit between the battery and generator when the voltage of the latter reaches 8 to 10 volts. The series winding of the cutout is so proportioned as to oppose the magnetic flux produced by the shunt windings whenever the generator speed and voltage decrease to a point where current from the battery tends to flow back through the generator. When this occurs the armature is actuated by the spring and the contacts opened. This action usually occurs whenever the car is operated at low speeds, or the engine is idling.

The generator 7 is of the regulated type used in connection with automotive vehicles, and in which means are either incorporated into the generator structure or associated therewith to maintain the generator current output at a safe value even when the generator is operated at high speeds. In most, if not all, of the generator output control systems in use the battery load on the generator is relied on as an important factor in controlling the output of the generator. That is to say, if during high speed operation of the generator the circuit from the generator to the battery was opened such as by a loose battery connection, or dirty or burned contacts in the cutout, the battery would no longer act as a load on the generator, and the voltage of the generator would rise to an abnormal degree with consequent damage to itself or other circuits, such as the car lighting circuit, which might be connected thereto.

As shown in Fig. 1, an intermediate electrode 16 is inserted in the cell 4 at the grounded end of the battery. This electrode extends below the normal level of the electrolyte in this cell. The electrode may be made of any material which is inert to action of the acid in the cell and will cause no deleterious electrolytic action to take place. Because of cheapness and ease of manufacture it is, however, preferred to make the electrode out of the same lead-antimony alloy that is used in making the battery grids.

This electrode is connected with the ungrounded terminal of the generator 7 through a signal lamp 17 which in the embodiment shown in Fig. 1 may be the standard 6-8 volt pilot lamp type. The light should preferably be located behind a green jewel and within the peripheral range of vision of the driver.

With the automotive vehicle functioning normally at average speeds, and the battery charging, current will flow from the generator through the signal lamp to the intermediate electrode and through the electrolyte in cell 4 to the grounded negative plate—thus indicating a go-ahead signal to the driver.

If, however, the electrolyte should fall below the end of the electrode 16, or the generator should have a broken brush or field coil or such other abnormality as to cause it to fail to generate sufficient voltage, the signal lamp will not light.

Also, if the generator regulator fails to hold the generator voltage within proper limits, or the cutout fails to close, or the battery terminals become disconnected, the excess voltage from the generator will cause the signal lamp to burn out. The driver will thus be notified of any of these various abnormalities through the absence of the go-ahead signal.

During operation of the generator, and with the connections shown in Fig. 1, a film of lead peroxide is probably formed on the electrode 16.

Any relatively nonconducting film of lead sulphate that may form on the electrode when the battery is standing idle is apparently broken down by the maximum voltage of the generator that occurs prior to the closing of the cutout contacts. At this time the full voltage of the generator is applied between the grounded negative plate of cell 4 and the intermediate electrode therein.

It will also be apparent that at very slow speeds of operation, or idling, and with the cutout open, the voltage applied to the signal lamp 17 will be insufficient to properly light the filament. This temporary indication during idling serves as a check on the charging indicator usually located on the instrument panel, or if desired may replace the same. It is much less likely to be ignored than would be the needle of a charging indicator.

Figure 2:
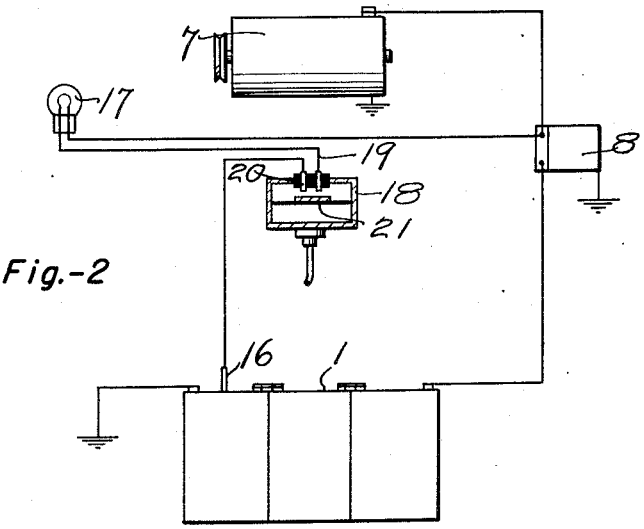
Fig. 2 is a similar view of a more comprehensive form of the circuit with added indication for the pressure in the oil system.

The arrangement shown in Fig. 2 is the same as that of Fig. 1, and the circuits function in the same manner, with the exception that a pressure controlled switch 18 has been inserted in the signal circuit. As shown in section the contacts 19, 20 of switch 18 are closed by a diaphragm 21, which in turn is actuated by normal oil pressure in the lubricating system of the engine of the automotive vehicle. In this embodiment the switch 18 has the function of not only interrupting the signal circuit upon decrease of oil pressure and thus indicating to the operator an abnormal engine condition, but it also serves to maintain open the circuit from the electrode 16 back through the generator and ground when the engine or vehicle is at rest. While not essential to the operation, as has been described, because of the full maximum generator voltage applied to the electrode, opening of the signal circuit during this period will tend to preserve the lead peroxide film on the electrode. One manner of accomplishing this is by the use of the oil pressure switch.

Also, should it be desired to use the electrode in any cell other than the grounded cell 4, the oil switch will permit this to be done as it will prevent any flow of current through the signal circuit due to voltage of the battery between ground and the cell in which the electrode is located when the vehicle is not in operation.

Further, when the positive end of the battery is grounded, as is the case with certain systems, any slight reverse current flow through the signal circuit which might occur because the electrode is negative with respect to the grounded positive plates of the cell, is prevented by the opening of the oil pressure controlled switch.

In the arrangement shown in Fig. 2 and just described, both the ammeter and oil pressure gauge may be omitted from the instrument panel, the green signal light serving in lieu of these instruments. If the signal light is extinguished during operation of the vehicle, the modification shown in Fig. 3 will enable the driver to readily ascertain whether the abnormality is in the circuit of the battery, the oil pressure system, or the generator.

In this arrangement the panel mounting 22, containing the pilot light, contains three push buttons. These push buttons for convenience may be marked, respectively, "Gen." "Oil," and "Battery." The "Gen." push button 23 provides a shorting circuit to ground around the oil switch and battery electrode. If upon extinguishment of the pilot light this button is pressed and the generator is still functioning, this fact will be indicated by the pilot light relighting.

Similarly the "Oil" push button 24 and the "Battery" push button 25, respectively, provide shorting circuits around the oil switch contacts and the battery electrode. Actuation of either of these push buttons will therefore indicate whether the difficulty exists in the oil pressure or the battery.

Figure 4:
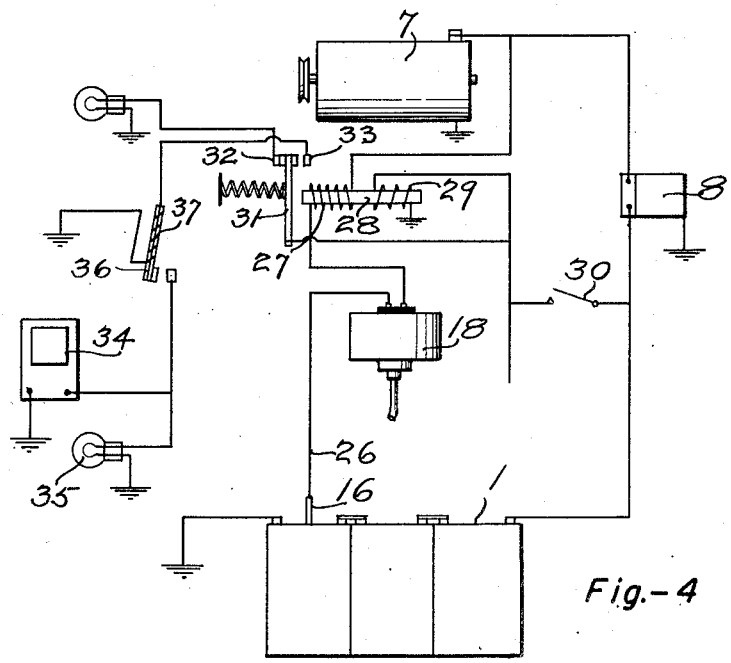
Fig. 4 is a view of a further modifications of the circuit.

The modification shown in Fig. 4 provides for an audible signal to be given in case of abnormal operation. In this case the test circuit 26 from the generator through the oil switch to the battery electrode 16 includes a winding 27 on a differential relay 28. A second winding 29, the ampere-turn value of which normally balances the first winding, is adapted to be energized when the ignition switch 30 is closed. The pivoted armature 31 of this relay is also connected to the circuit leading to the ignition switch. With everything functioning normally the relay is balanced and the armature remains against a contact 32, which energizes the green pilot light 17.

If, however, an abnormal condition arises in either the generator, the oil system or the electrolyte level, the relay becomes unbalanced and the armature thereof is actuated against a second contact 33. This contact is connected to a buzzer 34 and red light 35 through a time limit switch 36, the purpose of which is to prevent operation of the buzzer each time the engine is started, or is idling. The form of time limit switch herein disclosed consists of a bimetallic strip 37 wound with a heating coil so designed as to give about a ½ to 1 minute delay in closing the contact to the buzzer and red light. This will prevent the buzzer from operating when the ignition is switched on and before the engine is running, but on the other hand should the ignition be inadvertently switched on, and the engine not started, the buzzer and red light will give an indication of this fact as soon as the time limit switch operates. If desired, either the buzzer or the red light may be used alone in this modification.

The modification in Fig. 5 is one in which each of the cells of the battery is provided with an intermediate electrode. These are connected to three pilot lights. When at rest, or in case of oil pressure failure, all three pilot light circuits are opened by a multiple contact switch operated by the diaphragm of the oil pressure switch.

In this form of the invention the oil switch 18 is grounded. It includes a grounded conducting diaphragm 38, subject to the pressure in the oil system. The housing of the switch also includes an insulating panel 39. This panel carries two fixed contacts 40 and 41 which are spaced from each other and connected by conductor 42 to the generator 7.

The panel 39 also supports a series of spaced spring contacts 43, 44 and 45 opposite the fixed contacts 41 and the diaphragm 38 respectively. In insulating, bridge piece 46 maintains the spring contacts at fixed distances from each other. It will be evident that when the diaphragm 38 rises against spring contact 45, it will raise the latter. The extent of the movement of contact 45 is such that the bridge piece 46 simultaneously brings contact 43 in contact with 40 and 44 and in contact with 41.

Spring contact 43 is connected through resistance 47 to the lamp 17. In this instance, the lamp 17 has a voltage of approximately 2.5 volts. Consequently, the resistance 47 will be selected of suitable value to compensate for the internal resistance of battery cells 2 and 3 as the lamp is connected in the cell 4 nearest the ground connection through the electrode 16.

In like manner, current supplied by the contact 44 is connected directly to lamp 48. Lamp 48, also of 2.5 voltage is connected to the electrode 49 placed in the middle cell 3. In this instance, the voltage drop through the cells 3 and 4 is such as to make the voltage through the lamp 48 the desired value without the use of added resistance.

Lamp 51 is connected through resistance 50 to spring contact 45. Lamp 51 is also connected to the electrode 52 in the most positive cell 2 of the battery. In this instance the generator voltage suffers successive drops in cell 2, lamp 51 and resistance 50, before reaching the ground in the switch 18.

In all of the forms of the invention above described the electrode 16 is the same. It may be applied to the usual storage battery cells in any desired manner. However, to make the arrangement most adaptable it is desirable to utilize the facilities of the conventional storage battery casing. Thus, in Fig. 6 I have shown the electrode as fitted within the usual opening provided for venting gases from the battery and for replacing the electrolyte solution. This filling opening 53 is of the usual type formed as part of the battery cover. A vented cap 54 is screw-threaded into the filling opening. In Fig. 6 I have shown the cap 54 to be separated from the opening 53 by interposing an electrode element. This consists of a hollow shell 56 externally screw-threaded to fit within the filling opening 53.

The upper portion of the shell 56 is internally screw-threaded to receive the original cap 54.

The hollow shell 56 is extended downwardly within the opening 53, and forms a terminal 58. Terminal 58 is sufficiently long to extend below the normal level of the electrolyte, but not below the level marking the point at which water should be added to the electrolyte. As shown in the drawing, the extension 58 is vertically slotted at one or more points to permit ready removal of gases through the vent cap.

The evident advantage of using the filling cap for the purpose of gauging the level of the electrolyte is that the conventional cap is centrally located and the same indication is given of a normal or abnormal condition regardless of whether the battery rests horizontally or at an inclination.

A variation of this adaptation to the customary filling cap is shown in Fig. 7. Here the vent opening 60 of the cap 54 has been enlarged. This enlargement permits the introduction of the center electrode. Here this electrode is formed of a lower rod 61 and a reduced upper end 62. The upper end 62 is screw-threaded, but passes through the opening 60 of the cap.

The portion 62 is longitudinally grooved, as shown at 63, and this groove extends downwardly into the lower rod 61. Collars 64 and 65 are supplied of various thicknesses. When two or more such collars are supplied, it is possible to use them in the desired combination so that the lower end rod 61 will be spaced far enough below the cap 54 to be below the normal level of the electrolyte. The several collars may be given different numbers or colors so that they may be selected for use with any particular make or type of battery in accordance with instructions to be supplied with the collars.

The upper end 62 of the electrode is tapered to receive a removable snap terminal leading to the indicating lamp 17.

The electrode is clamped tightly in the cap 54 by means of nut 67, which is screw-threaded over the upper end 62, and draws the adjusting collars 64 and 65 tightly against the cap 54.

The grooves 63, extending from the lower rod 61 past the nut 67, serves the same purpose as the vent hole originally provided in the cap 54.

The signal circuit which I employ is of the series type, and other functions of the power plant such as a low level in the gas tank, a non-released emergency brake, or engine temperature, may be indicated by the single indicating means.

Figure 3:
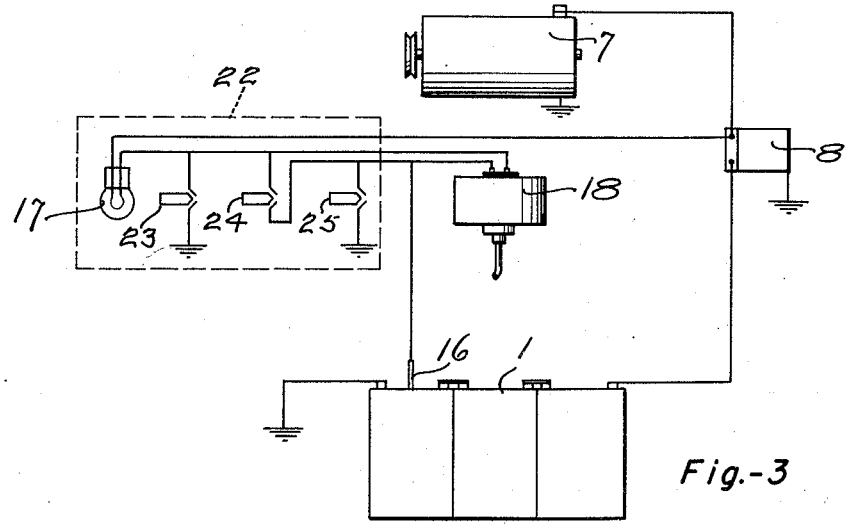
Fig. 3 is a similar view of a circuit like that shown in Fig. 2 but having selective and individual indicating means.
Figure 8:
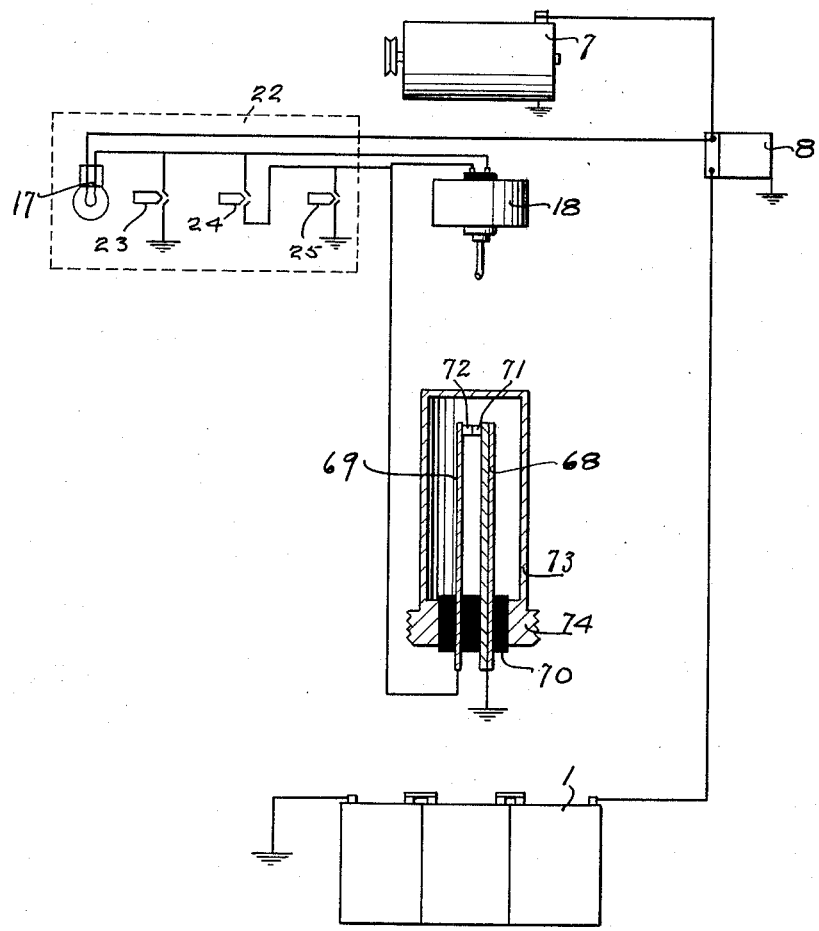
Fig. 8 is a circuit similar to that shown in Fig. 3, but with a variation in the functions indicated by the signal.

Fig. 8 shows a modification of the signal circuit of Fig. 3 and in which normal engine temperature is indicated, the green signal light in this modification serving in lieu of each of the ammeter, the oil pressure gauge and the engine temperature gauge, and eliminating all of these various indicating devices from the instrument panel.

In Fig. 8 the element for obtaining an indication of engine temperature comprises a bimetallic strip 68, mounted adjacent a fixed member 69. These members, as shown, are mounted at their lower ends in an insulating block 70, and carry at their top ends a pair of cooperating contacts 71, 72.

The insulating block 70 is mounted in the end of a hollow cylindrical metal capsule or container 73, the outer end of which is provided with screw threads 74, which permit the capsule to be inserted in a suitable screw-threaded opening in the water space in the engine.

The thickness and initial bias of the bimetallic member 68 is such that under normal temperature conditions, contacts 71, 72 will remain closed, but should the temperature exceed 212° F., or any other pre-selected temperature, the contacts 71, 72 will open through the movement of the bimetallic member 68.

The operation of the indicating device will be readily apparent from the above description. In the form shown in Figs. 1 and 2, there is a continuously closed lighting circuit from the generator to the most negative battery cell. Thus the lamp 17, if placed within the field of vision of the operator, will at all times assure him that a normal condition occurs not only at the level of the electrolyte, and consequently the proper functioning of the battery, but also that the generator is charging at a normal rate. When the light is extingushed, the operator is immediately warned to look for trouble both in the battery and the generating system.

In Fig. 2 the visual indication is also subject to the normal condition of the oil pressure system so that a third operating condition of the power plant is at all times available.

Where the lamp is extinguished because of the abnormality in one or another function, the particular location of trouble is readily determined by the operator without any further investigation than the use of the test switches 23, 24 and 25 on the control panel. (See Figs. 3 and 8.).

As shown in Fig. 8, the signal circuit is similar to Fig. 3 in that the signal lamp 17 is connected directly to the ungrounded side of the generator, and includes the oil pressure switch 18 and the temperature controlled contacts 71, 72, and thence to ground. The signal circuit will show abnormal operating conditions due to generator trouble, lack of sufficient oil pressure, and excessive engine temperature.

As previously explained in connection with Fig. 3, the cause of the abnormal condition may be ascertained by means of the switches 23, 24 and 25, by means of which various portions of the signal circuit may be shorted. On stopping the engine the oil pressure switch 18 is opened, thus inactivating the circuit through the temperature controlled element.

In Fig. 8 the electrolyte level indication has been omitted as its inclusion is not essential in this phase of the invention. It is to be understood, however, that if desired it could be included in the indicating circuit of this modification, the only change necessary being the addition of another shorting test switch to the panel 22.

The same advantageous arrangement admits of the use of a time delay element and audible signals, such as illustrated in Fig. 4.

While I have shown the adaptability of my indicating device to several arrangements of automotive power plants, other arrangements and alterations in specific details and proportions will, of course, suggest themselves without, however, departing from the scope of the following claims.

What I claim is:

1. In an electrical system for automotive vehicles the combination of an electrical generator, a storage battery, an electrical circuit between the generator and battery, said circuit including an electrical cutout an intermediate electrode extending below the normal level of the electrolyte in one battery cell, a shunt circuit between the generator side of the electrical cutout and intermediate electrode, and a signal means in said shunt circuit.

2. In an electrical system for automotive vehicles the combination of an electrical generator, a storage battery, an electrical circuit between the generator and battery, said circuit including a series electrical cutout, a ground return for said circuit, an intermediate electrode extending below the normal level of the electrolyte in the battery cell nearest the ground return, a shunt circuit between the generator side of the electrical cutout and said intermediate electrode, and a signal means in said shunt circuit.

3. In an electrical system for automotive vehicles the combination of an engine, an electrical generator, a storage battery, an electrical circuit between the generator and battery, said circuit including an electrical cutout, a ground return for said circuit, an intermediate electrode extending below the normal level of the electrolyte in the battery cell nearest the ground return, a shunt circuit between the generator side of the cutout and said intermediate electrode, a signal means in said shunt circuit, and means responsive to the normal operation of the engine for maintaining said signal circuit closed.

4. In combination with an automobile having an engine, an oil pressure system therefor, an electrical generator, a storage battery, an electrical circuit between the generator and battery, said electrical circuit including an electrical cutout, a ground return for said circuit, an intermediate electrode extending below the normal level of the electrolyte in the battery cell nearest the ground return, a shunt circuit between the generator side of the cutout and said intermediate electrode, a signal means in said shunt circuit and means responsive to the pressure in the oil system for maintaining said signal circuit closed.

5. In combination with an automobile having an engine, an oil pressure system therefor, an electrical generator, a storage battery, an electrical circuit between the generator and battery, said electrical circuit including an electrical cutout, a ground return for said circuit, an intermediate electrode extending below the normal level of the electrolyte in the battery cell nearest the ground return, a shunt circuit between the generator side of the electrical cutout and said intermediate electrode, a signal means in said circuit, means responsive to the pressure in the oil system for maintaining said shunt circuit closed, and a plurality of switches intercalated in said shunt circuit to selectively energize the signal means through the generator circuit, the intermediate battery electrode and the means responsive to oil pressure.

6. In combination with an automobile having an engine, an oil pressure system therefor, an electrical generator, a storage battery, an electrical circuit between the generator and battery, said circuit including an electrical cutout, a ground return for said circuit, an intermediate electrode extending below the normal level of the electrolyte in the battery cell nearest the ground return, a shunt circuit between the generator side of the electrical cutout and said intermediate electrode, a signal means in said circuit, means responsive to the pressure in the oil system for maintaining said shunt circuit closed, a grounding switch between the signal means and the pressure responsive means, a grounding switch between the pressure responsive means and the battery, and a switch connecting the signal means to the intermediate electrode.

7. In combination with an automobile having an engine, an electrical generator and a storage battery, an electrical circuit between the generator and the storage battery, said circuit including a series of electrical cutouts, a ground return for said circuit, an intermediate electrode extending below the normal level of the electrolyte in a battery cell, a circuit directly connecting the generator side of the electrical cutout with said electrode, a signal means in said circuit, and means responsive to abnormal operation of either the engine, generator or battery for altering the indication of the signal means.

8. In combination with an automotive vehicle, an engine, an electrical generator, a storage battery having an intermediate electrode, an electrical circuit between the generator and the storage battery, an automatic cutout in said circuit controlled by the generator voltage, a ground return for said circuit, a shunt circuit from the ungrounded side of the generator to the intermediate electrode of said storage battery, a single signal means in said circuit, a plurality of circuit closing means in said circuit, responsive to abnormal operation of the engine or generator for altering the indication of the signal means, and a plurality of manually operated test switches for individually providing a short circuit around said circuit closing means.

9. In an electrical system for automotive vehicles, the combination of an engine, an electrical generator, a storage battery, an electrical circuit between the generator and battery, including a ground return for said circuit, an automatic cutout in said circuit, an intermediate electrode extending below the normal level of the electrolyte in the battery cell nearest the ground return, a second circuit between the generator and said intermediate electrode, in shunt with said cutout, a signal means in said second circuit, and means associated with engine operation for closing said second circuit only when the engine is operating.

10. In an electrical system for automotive vehicles, the combination of an electrical generator having an output charging terminal; a storage battery; an intermediate electrode extending below the normal level of the electrolyte in one battery cell; a charging circuit between said generator output charging terminal and said storage battery; an electrical cutout connected in series with said charging circuit; a shunt test circuit connected between said generator output charging terminal and said intermediate electrode; and a current responsive sensory signalling means connected in series with said shunt circuit.

11. In an electrical system for automotive vehicles, the combination of an electrical generator having an output charging terminal; a storage battery; an intermediate electrode extending below the normal level of the electrolyte in one battery cell; a charging circuit between said generator output charging terminal and said storage battery; an electrical cutout connected in series with said charging circuit; a shunt test circuit connected between said generator output charging terminal and said intermediate electrode; a current responsive sensory signalling means connected in series with said shunt circuit; and a plurality of normally closed electrical switches connected in series with said shunt test circuit, each switch being respectively associated with a different functional aspect of the vehicle engine and open circuited upon failure of the respective vehicle functional aspect with which it is associated.

12. In an electrical system for automotive vehicles, the combination of an electrical generator having an output charging terminal; a storage battery; an intermediate electrode extending below the normal level of the electrolyte in one battery cell; a charging circuit between said generator output charging terminal and said storage battery; an electrical cutout connected in series with said charging circuit; a shunt test circuit connected between said generator output charging terminal and said intermediate electrode; a current responsive sensory signalling means connected in series with said shunt circuit; a plurality of normally closed electrical switches connected in series with said shunt test circuit, each switch being respectively associated with a different functional aspect of the vehicle engine and adapted to be automatically open circuited upon failure of the respective vehicle functional aspect with which it is associated; and testing means associated with each of said switches for conditionally short-circuiting the same.

13. In an electrical system for automotive vehicles, the combination of an electrical generator; a storage battery; an electrical circuit between the generator and battery, said circuit including an electrical cutout; an intermediate electrode extending below the normal level of the electrolyte in one battery cell; a normally closed shunt circuit between the generator side of the electrical cutout and said intermediate electrode; and a signal means in said shunt circuit.

14. In an electrical system for automotive vehicles, the combination of an electrical generator; a storage battery; an electrical circuit between the generator and battery, said circuit including a series electrical cutout; a ground return for said circuit; an intermediate electrode extending below the normal level of the electrolyte in the battery cell nearest the ground return; a normally closed shunt circuit between the generator side of the electrical cutout and said intermediate electrode; and a signal means in said shunt circuit.

15. In an electrical system for automotive vehicles, the combination of an engine; an electrical generator; a storage battery; an electrical circuit between the generator and battery, said circuit including an electrical cutout; a ground return for said circuit; an intermediate electrode extending below the normal level of the electrolyte in the battery cell nearest the ground return; a shunt circuit between the generator side of the cutout and said intermediate electrode; a signal means in said shunt circuit; and means responsive to the normal operation of the engine for maintaining said signal circuit closed.

16. In an electrical system for automotive vehicles, the combination of an electrical generator; a storage battery; an electrical circuit between the generator and battery, said circuit including an electrical cutout; an intermediate electrode extending below the normal level of the electrolyte in one battery cell; a shunt circuit between the generator side of the electrical cutout and said intermediate electrode; a signal means in said shunt circuit; and means included in said shunt circuit for interrupting the continuity thereof in response to excessive current therethrough.

17. In an electrical system for automotive vehicles, the combination of an electrical generator; a storage battery; an electrical circuit between the generator and battery, said circuit including a series of electrical cutouts; an intermediate electrode extending below the normal level of the electrolyte in one battery cell; a normally closed shunt circuit between the generator on the side of the electrical cutout and said intermediate electrode; a signal means in said shunt circuit; and means connected in series with said shunt circuit for interrupting the continuity thereof in response to excessive current therethrough.

18. In an electrical system for automotive vehicles, the combination of an engine; an electrical generator; a storage battery; an electrical circuit between the generator and battery, said circuit including an electrical cutout; a ground return for said circuit; an intermediate electrode extending below the normal level of the electrolyte in the battery cell nearest the ground return; a shunt circuit between the generator side of the cutout and said intermediate electrode; a signal means in said shunt circuit; means responsive to the normal operation of the engine for maintaining said signal circuit closed; and means connected in series with said shunt circuit for interrupting the continuity thereof in response to excessive current therethrough.

HAYNER H. GORDON.

REFERENCES CITED

The following references are of record in the file of this patent:

UNITED STATES PATENTS

| Number | Name | Date |
| --- | --- | --- |
| 1,431,914 | Dashner et al. | Oct. 10, 1922 |
| 1,568,829 | Goff | Jan. 5, 1926 |
| 1,694,687 | McCartie | Dec. 11, 1928 |
| 1,753,381 | Levings | Apr. 8, 1930 |
| 1,818,185 | Yull | Aug. 11, 1931 |
| 2,064,460 | Carr et al. | Dec. 15, 1936 |
| 2,074,895 | Durant | Mar. 23, 1937 |
| 2,181,182 | Goguen et al. | Nov. 28, 1939 |
| 2,377,569 | Morse | June 5, 1945 |